United States Patent
Durand et al.

(10) Patent No.: US 6,502,497 B1
(45) Date of Patent: Jan. 7, 2003

(54) SUSPENSION DEVICE FOR CONNECTING AN ITEM OF ON-BOARD EQUIPMENT TO THE STRUCTURE OF A VEHICLE, PARTICULARLY A ROTARY-WING AIRCRAFT

(75) Inventors: François Durand, Magny les Hameaux (FR); Sylvie Quechon, Chevreuse (FR); Bernard Fontaine, Villebon sur Yvette (FR)

(73) Assignee: Aerospatiale Matra Missiles, Paris (FR)

( * ) Notice: Subject to any disclaimer, the term of this patent is extended or adjusted under 35 U.S.C. 154(b) by 153 days.

(21) Appl. No.: 09/689,724

(22) Filed: Oct. 13, 2000

(30) Foreign Application Priority Data

Oct. 25, 1999 (FR) ............................................ 99 13276

(51) Int. Cl.$^7$ ................................................ F41G 5/18
(52) U.S. Cl. ...................... 89/41.21; 89/41.01; 248/638; 248/610; 248/636
(58) Field of Search .............................. 244/1 R, 129.1; 89/41.01, 41.02, 41.05, 41.06, 41.21; 248/638, 610, 636

(56) References Cited

U.S. PATENT DOCUMENTS

| | | | | |
|---|---|---|---|---|
| 3,829,659 A | | 8/1974 | Margolis .................. 235/61.55 |
| 5,483,865 A | * | 1/1996 | Brunand ...................... 89/41.21 |
| 5,710,945 A | | 1/1998 | Thompson .................... 396/13 |
| 5,751,578 A | * | 5/1998 | Quinn et al. ................. 364/453 |
| 5,970,042 A | * | 10/1999 | Fujimoto et al. ............ 369/247 |
| 6,149,112 A | * | 11/2000 | Thieltges .................. 248/178.1 |

FOREIGN PATENT DOCUMENTS

| | | |
|---|---|---|
| EP | 0588684 | 3/1994 |
| WO | 98016871 | 4/1998 |

OTHER PUBLICATIONS

French Novelty Search Report, with Annex, dated Jul. 21, 2000.

* cited by examiner

Primary Examiner—J. Woodrow Eldred
(74) Attorney, Agent, or Firm—Stevens, Davis, Miller & Mosher, LLP (57) ABSTRACT

The present invention relates to a suspension device (4) for connecting an item of on-board equipment (2) to the structure (3) of a vehicle, particularly a rotary-wing aircraft, said suspension device (4) comprising first and second parts (5, 6) shaped in the form of plates and capable of being fixed to said structure (3) and to said item of equipment (2), and suspension means (7) which are arranged between said first and second parts (5, 6).

According to the invention, the suspension device (4) additionally comprises a locking system (20) capable of bringing the suspension device (4) into one of two positions: a locked position in which the locking system (20) immobilizes the first and second parts (5, 6) one with respect to the other, and an unlocked position in which the locking system (20) releases said parts (5, 6) so that they can move relative to one another, and means (21) for controlling the locking system (20).

17 Claims, 5 Drawing Sheets

SUSPENSION DEVICE FOR CONNECTING AN ITEM OF ON-BOARD EQUIPMENT TO THE STRUCTURE OF A VEHICLE, PARTICULARLY A ROTARY-WING AIRCRAFT

BACKGROUND OF THE INVENTION

The present invention relates to a suspension device for connecting an item of on-board equipment to the structure of a vehicle.

Although not exclusively, said suspension device is more particularly intended to be arranged between the structure of a rotary-wing aircraft, particularly a helicopter, and a sighting apparatus of this helicopter, for example an infrared sight.

It is known that helicopter-mounted equipment such as in this preferred application is subjected to significant vibrational phenomena due in particular to the respective main and tail rotors, to their blades, to the transmissions, to the engine, etc., and to variable load factors of the helicopter which are due to its courses and to which said on-board equipment is subjected.

Hence, when the item of equipment is a sighting apparatus mounted on the structure of the helicopter, the impact of these various influences is detrimental to the effectiveness of said sighting apparatus. This often results in a degradation of the stabilization by direct action of the vibration, particularly on the gyroscope and the supports for the optical units, in a degradation in comfort, because the vibration is then transmitted to the images displayed to the sight operator, and in a reduction in the actual reliability of the apparatus, because, for example, the optoelectronic sensors in this sighting apparatus are subjected to constant vibration. What is more, the load factors corresponding to the accelerations of the helicopter also act directly on this equipment.

DESCRIPTION OF THE PRIOR ART

Document EP-0 588 684 discloses a suspension device capable of overcoming these drawbacks. To this end, that known suspension device comprises:

first and second parts shaped at least approximately in the form of plates and capable of being fixed respectively to said structure and to said sighting apparatus; and suspension means which are arranged between said first and second parts and which are capable of absorbing, on the one hand, relative linear displacements of said first and second parts along three reference axes in roll, pitch and yaw of said vehicle and, on the other hand, the relative angular excursions of said first and second parts about said three reference axes.

This known suspension device therefore constitutes a "six axes" suspension, making it possible to minimize both translational displacements along the three reference axes of the vehicle and angular excursions about these axes, which are produced by the vibrations and the load factors.

In consequence, by virtue of this known suspension device, it is possible to stabilize the sighting apparatus, and this in particular makes it possible to improve the visual comfort of the operator using this sighting apparatus and, above all, to improve the reliability of said apparatus. The line of sight can therefore be stabilized on an observed target and is no longer subjected to the aforementioned displacements and excursions.

However, this stabilizing of the line of sight, which therefore presents an advantage for most envisaged uses (observing the territory, observing and tracking a target, etc.) can, however, become a handicap in certain specific applications, or even not be suited to such applications at all.

Specifically, it may be useful or even necessary, in certain specific applications specified hereinbelow by way of example, to keep the line of sight in a given position with respect to a given reference axis which depends on the helicopter or on a particular item of equipment of said helicopter.

For this type of application, it is therefore necessary, if the operator, particularly the pilot of the helicopter, does not wish to or cannot make his observations with the naked eye, to provide an additional special-purpose sighting apparatus which is fixed appropriately to the structure of the helicopter, this of course increasing the cost and bulk and not being practical, because said operator then has to monitor two different sighting apparatuses.

SUMMARY OF THE INVENTION

The present invention relates to a suspension device making it possible to overcome these drawbacks.

To this end, according to the invention, the suspension device for connecting an item of on-board equipment to the structure of a vehicle, particularly a rotary-wing aircraft, said suspension device comprising:

first and second parts shaped at least approximately in the form of plates and capable of being fixed respectively to said structure and to said item of equipment; and suspension means which are arranged between said first and second parts and which are capable of absorbing, on the one hand, relative linear displacements of said first and second parts along three reference axes in roll, pitch and yaw of said vehicle and, on the other hand, the relative angular excursions of said first and second parts about said three reference axes, is noteworthy in that it additionally comprises:

a controllable locking system capable of bringing said suspension device into one of the following two positions:

a locked position in which said locking system immobilizes said first and second parts one with respect to the other in a given relative position; and an unlocked position in which said locking system releases said first and second parts to move relative to one another; and control means for controlling said locking system.

Thus, by virtue of the invention, the suspension device is capable of fulfilling a dual role, namely:

a conventional stabilizing role, such as the one fulfilled, for example, by the suspension device described in the aforementioned document EP-0 588 684, allowing the equipment item to be stabilized with respect to the structure; and a securing role making it possible, by virtue of the action of the locking system, to secure the equipment item to the structure, respective reference planes of the equipment item and of the structure thus being fixed, for example parallel, one with respect to the other.

In addition, by virtue of said control means, it is possible to switch rapidly from one of said positions (locked position or unlocked position) to the other position. To this end, said control means can be actuated, either manually by an operator or automatically, for example according to the use of another item of equipment of the helicopter which is, for example, used simultaneously with said suspended equipment item.

According to the invention, said locking system comprises at least two, and preferably three, locking means as specified hereinbelow.

In a preferred embodiment, at least one of said locking means comprises:

a first element fixed to one of said first and second parts, facing the other of said parts;

a second element at least partially connected to said other part and capable of collaborating with said first element to obtain a fixed connection between said first and second parts, via said first and second elements; and a controllable third element capable of bringing said first and second elements into collaboration to obtain said locked position, and capable of separating said first and second elements one from the other to obtain said unlocked position.

In the context of the present invention, said first, second and third elements may be embodied in different ways.

In a first embodiment, said first element comprises a tenon, said second element comprises a centering piece which is fixed to said other part facing said tenon and which comprises a mortise of a shape tailored to said tenon, and said third element comprises a means capable of bringing said two parts closer together in order to bring said tenon into said mortise.

In a second embodiment, said first element comprises a housing, said second element comprises a moving pin which can be guided by a guide fixed to said other part and which is capable of entering said housing which has a shape tailored to said pin, and said third element comprises a means of displacing said moving pin.

It will be noted that, in the latter instance:

in a first alternative form, said locking system comprises two locking means, for one of which the length of the part of the housing capable of accommodating said pin is greater than or equal to twice the diameter of said pin which has a circular cross section; and in a second alternative form, said locking system comprises three similar locking means, for each of which the length of the part of the housing capable of accommodating said pin is less than twice the diameter of said pin which has a circular cross section.

Furthermore, in a third embodiment of the invention, said first element comprises a sphere, said second element comprises at least two moving parts shaped so as to be able to trap said sphere, and said third element comprises a means capable of displacing said moving parts.

In addition, in a fourth embodiment, said first element comprises a pin which has at least one annular groove on its outer face, said second element comprises an actuatable clamping system comprising at least four spheres capable of trapping said pin by acting in said groove, in a uniformly distributed way around the periphery of said pin, and said third element comprises a means capable of actuating said clamping system.

It will be noted that, in the latter instance:

in a first alternative form, said locking system comprises two similar locking means, for each of which the pin has two annular grooves and the clamping system has eight spheres capable of acting in groups of four spheres in said two grooves respectively; and in a second alternative form, said locking system comprises three similar locking means, for each of which the pin has just one annular groove and the clamping system has four spheres.

Finally, according to the invention:

in a fifth embodiment, said first element comprises a sphere, said second element comprises an actuatable clamping system capable of trapping said sphere, and said third element comprises a means capable of actuating said clamping system; and in a sixth embodiment, said first element comprises a part which has a double housing, said second element comprises an actuatable clamping system, the two free ends of said clamp being capable of acting respectively in said double housing, and said third element comprises a means capable of actuating said clamping system.

The present invention also relates to a sighting system for a vehicle, particularly a rotary-wing aircraft, of the type comprising:

a sighting apparatus comprising a sighting means capable of taking images of the external environment of said vehicle and a display means capable of displaying the images taken by said sight means; and a suspension device allowing said sight means to be connected to the structure of said vehicle.

According to the invention, this sighting system is noteworthy in that said suspension device is a device of the type specified hereinabove, and said sighting system has two different sighting modes:

a stabilized sighting mode, for which said suspension device is brought into the aforementioned unlocked position; and a fixed sighting mode, for which said suspension device is brought into the aforementioned locked position.

This sighting system therefore has two different and complementing sighting modes. In consequence, there is no need to use two different sighting systems to employ these two sighting modes.

The present invention also relates to a weapon system comprising, in the known way:

a vehicle, particularly a rotary-wing aircraft;

a first weapon unit mounted on said vehicle; and a sighting system also mounted on said vehicle and capable of taking images of the environment of said vehicle, at least during use of said first weapon unit.

This first weapon unit may, for example, be a known missile-firing system, for example for firing passively guided missiles. To track and/or guide such missiles, it is generally particularly advantageous, or even necessary, to use a stabilized sighting system, especially when the firing vehicle is subjected to numerous and strong vibrations, as is the case, for example, with helicopters.

By contrast, it is known that in the case of other known weapon units, for example gunfire systems or systems for firing various projectiles (shells, bullets, rockets, etc.), if the firing operator uses a sighting system, it is absolutely essential that the line of sight of the latter be locked to, and preferably parallel to, the firing line of said gunfire system (or projectile-firing system).

This is because if the line of sight of the sighting system, instead of being fixed, were stabilized onto a target, the firing line of the gunfire system (which is secured to the structure of the vehicle and therefore subjected to its vibrations) would have a permanent offset from said line of sight (when firing at said target) of angular values which represent said vibrations.

In consequence, if the vehicle is to be equipped with two different weapon units, that is to say ones requiring two different sighting modes, for example the aforementioned weapon units, it is necessary:

either to provide two sighting systems tailored to said different weapon units, which is expensive, bulky and in particular requires two separate display screens, which are hardly practical to monitor;

or to actuate one of the weapon units, for example the gunfire system, without using a sighting system, taking sightings with the naked eye, which is, of course, imprecise and difficult, or even impossible, to achieve, particularly by night or in foggy conditions.

In order to overcome these drawbacks and to allow the use of a single sighting system for two weapon units requiring different sighting modes, for example a missile firing system and a gunfire system, the weapon system of the aforementioned type is noteworthy, according to the invention, in that its sighting system is a sighting system according to the invention, as described hereinabove, and in that it is formed in such a way as to be brought automatically, or following operator actuation:

into said stabilized sighting mode when one of said first and second weapon units is used; and into said fixed sighting mode when the other of said first and second weapon units is used.

In consequence, by virtue of the invention, a multi-function weapon system is obtained, containing just one sighting system.

BRIEF DESCRIPTION OF THE DRAWINGS

The figures of the appended drawing will make it easy to understand how the invention may be achieved. In these figures, identical references denote similar elements.

DESCRIPTION OF THE PREFERRED EMBODIMENTS

Figure 1:
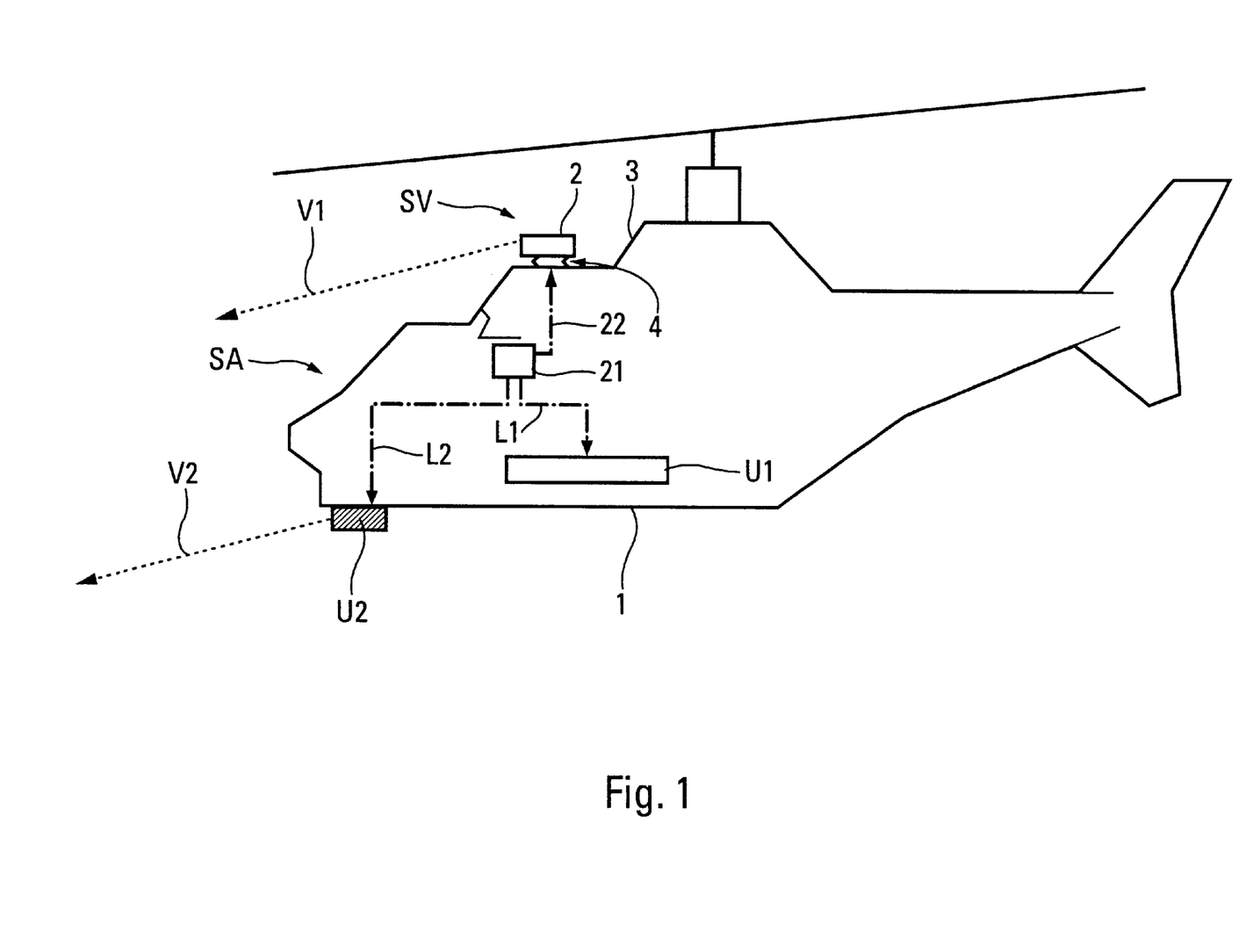
FIG. 1 diagrammatically shows a vehicle on which there is mounted a sighting system equipped with a suspension device according to the invention.

The vehicle 1, in this case a helicopter, depicted diagrammatically in FIG. 1, is equipped with an item of on-board equipment 2, which is connected to the structure 3 of said helicopter 1 via a suspension device 4 according to the invention, making it possible to absorb the vibrations and movements encountered on this kind of rotary-wing aircraft. By way of example, the item of equipment 2 is a sighting means of a sighting apparatus specified hereinbelow.

Figure 2:
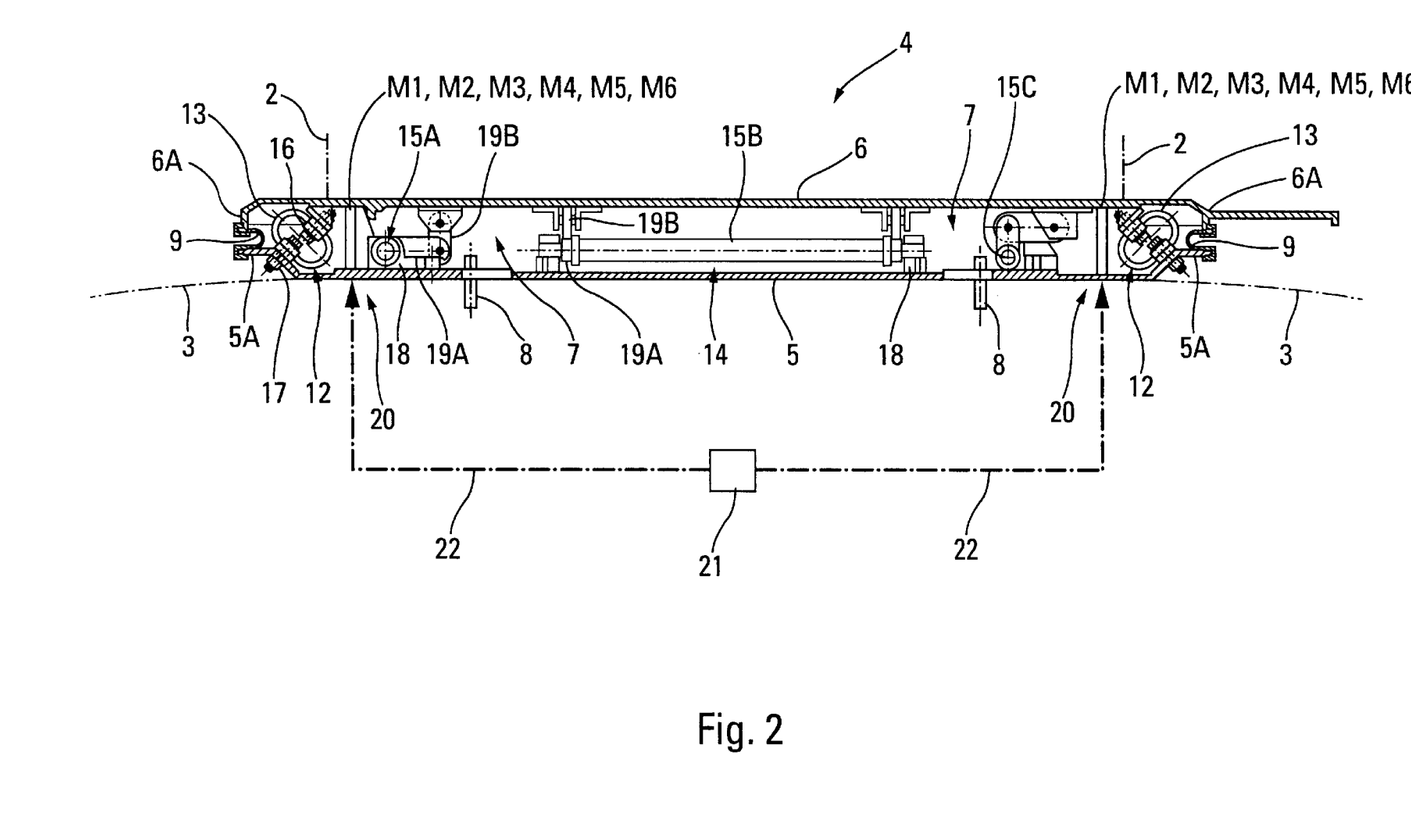
FIG. 2 diagrammatically shows a suspension device according to the invention.

In a known way (see, for example, document EP-0 588 684), said suspension device 4 comprises, as depicted in FIG. 2:

two parts 5 and 6 shaped at least approximately in the form of plates and fixed to said structure 3 and to said item of equipment 2 respectively. By way of example, the part 5 is fixed to the structure 3 via means 8, for example bolts, while the part 6 carries the equipment item 2 via known fixing means which have not been depicted; and suspension means 7 provided between said parts so that the part 6 which takes the item of equipment 2 is suspended with respect to the part 5 which is fixed to the structure 3 of the vehicle 1.

The suspension device 4 additionally comprises, by way of example, an elastic flexible seal 9 which provides a sealed connection between the curved ends 5A and 6A of said parts 5 and 6.

In addition, said suspension means 7 comprise:

on the one hand, damping members 12 intended to act along the three reference axes of roll, pitch and yaw of said vehicle 1, so as to absorb the relative linear displacements of the parts 5 and 6 along said reference axes. In this particular instance, the issue is one of absorbing the linear displacements of the part 6 and therefore of the suspended item of equipment 2, with respect to the part 5 and therefore with respect to the structure 3 of the vehicle 1; and on the other hand, suspension members 14 intended to act about said three reference axes so as to absorb the relative excursions of the parts 5 and 6 about these reference axes. In this particular instance, the issue is one of absorbing the excursions of the part 6 and therefore of the suspended item of equipment 2 with respect to the part 5, and therefore with respect to the structure 3 of the vehicle 1.

By way of a preferred embodiment, said damping members 12 consist of a number of identical closed loops 13 which have an oblong configuration and which are all contained in planes orthogonal to the plane formed by the reference axes of roll and pitch, corresponding to the part 5 which is fixed with respect to the structure 3 of the helicopter 1. Each loop 13 is mounted on the parts 5 and 6 via special-purpose supports 16 and bolts 17 directed along the minor axis of the oblong loops, at right angles to the major axis.

These closed loops 13 are eight in number, for example, and are distributed at uniform angles from one another, therefore making angles of 45° between them. Structurally, said loops 13 are made of a metallic material, in the form of cables, thus providing good elasticity and a high degree of damping.

In addition, by way of a preferred embodiment, the elastic suspension members 14 of said suspension means 7 are formed of torsion bars, the purpose of which is to prevent angular excursions about the three reference axes of the helicopter 1. For this, three torsion bars known therefore as the anti-roll bar 15A, the anti-pitch bar 15B and the anti-yaw bar 15C are provided, to act about the corresponding axes of the helicopter 1 and thus absorb the angular excursions.

Each torsion bar 15A, 15B and 15C is connected:

to the part 5, via spherical bearings 18 fixed to said part 5; and to the part 6, via two sets of two link rods 19A and 19B each, these rods being articulated together.

According to the invention, said suspension device 4 additionally comprises, as depicted in FIG. 2:

a controllable locking system 20 capable of bringing said suspension device 4 into one of the following two positions:

a locked position in which said locking system 20 immobilizes said parts 5 and 6 one with respect to the other in a given relative position. As a preference, said parts 5 and 6 are immobilized parallel to one another; and an unlocked position in which said locking system releases said parts 5 and 6 to move relative to one another; and control means 21 for controlling said locking system, as illustrated by arrows 22 in chain line.

Thus, by virtue of the invention, the suspension device 4 is capable of fulfilling a dual role, namely:

a conventional stabilizing role, such as the one fulfilled, for example, by the suspension device described in the aforementioned document EP-0 588 684, allowing the item of equipment 2 to be stabilized with respect to the structure 3, under the action of the suspension 7; and a securing function making it possible, by virtue of the action of the locking system 20, to secure the item of equipment 2 to the structure 3, the respective reference planes of the item of item 2 and of the structure 3 thus being fixed, preferably parallel, one with respect to the other. In this last position (locked position), because of the immobilization achieved, the suspension means 7 are inactive.

In addition, by virtue of said control means 21, it is possible to switch quickly from one of said positions (locked position or unlocked position) to the other. To this end, said control means 21 can be actuated, either manually by an operator, or automatically, for example according to the type of some other item of equipment of the helicopter which is used simultaneously with said item of equipment 2, as specified hereinbelow.

According to the invention, said locking system 20 generally comprises three locking means M1 to M6 specified hereinbelow and arranged at various zones between said parts 5 and 6. In particular, one of these locking means can be arranged along the longitudinal axis, not depicted, of the part 6 toward the front of the item of equipment 2 and the other two locking means may be arranged one on each side of this longitudinal axis, toward the rear of the item of equipment 2.

However, in certain particular embodiments, two locking means may suffice for fulfilling the aforementioned immobilizing role, as specified hereinbelow.

According to the invention, each of said locking means M1 to M6 comprises:
  a first element E1 to E6 fixed to one 6 of said parts 5 and 6, facing the other 5 of said parts 5 and 6;
  a second element F1 to F6 at least partially connected to said other part 5 and capable of collaborating with said first element E1 to E6 to obtain a fixed connection between said parts 5 and 6, via said first and second elements; and
  a controllable third element G1 to G6 which is capable of being controlled by the control means 21, which can bring said first and second elements into collaboration, to obtain said locked position, and which can separate said first and second elements from each other, to obtain said unlocked position.

In the context of the present invention, said locking means may be embodied according to various embodiments M1 to M6 specified hereinbelow.

It will also be noted that a locking system 20 may comprise locking means M1 to M6 of different embodiments.

As a preference, however, one same locking system 20 comprises locking means of the same type, for example M2.

Figure 3:
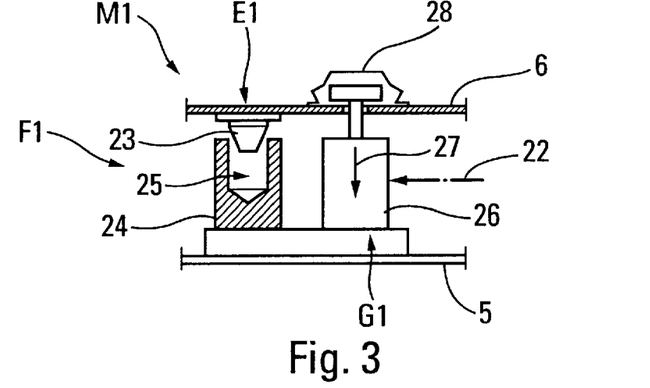
FIGS. 3 to 10 illustrate various embodiments of a locking means of a suspension device according to the invention.

In a first embodiment depicted in FIG. 3, the element E1 of the locking means M1 comprises a tenon 23 of conical shape which is fixed to the part 6, and the element F1 comprises a centering piece 24 which is fixed to the part 5 and which comprises a mortise 25 of a shape tailored to said tenon 23.

In addition, the element G1 comprises a means 26, in this instance a conventional pulling means, controllable as illustrated by the link 22, which can bring the part 6 closer to the part 5, as shown by arrow 27, to bring said tenon 23 into said mortise 25. Said means 26 is covered on the external face of the part 6 by a sealing boot 28. This controllable means can also be a pushing means of the conventional type.

It will be noted that, for a locking system 20 which comprises three locking means M1 of this type, the three means 26 pull the part 6 and immobilize it in a known position imposed by the centering pieces 24. This upper part 6 is thus forced into a lower position, with centering making any rotation impossible.

However, it is possible to dispense with the centering, when the azimuthal position is unimportant. In this case, the pressing force on the plate 6 has to be sufficient to keep this plate in the fitment plane in question. It has to overcome the force needed to displace the suspension into the lowered position.

It will further be noted that:
  the means 26 may also be fixed, for example by a hook, not depicted, to the underside of the part 6 so that the sealing boot 28 can then be omitted; and
  the tenon may just as easily be spherical or of some other appropriate shape.

Figure 4:
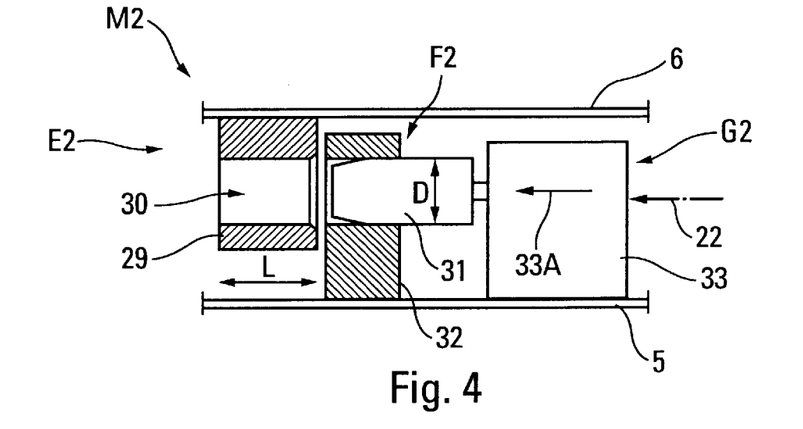

In a second embodiment M2 depicted diagrammatically in FIG. 4, the element E2 comprises a part 29 equipped with a housing 30 and the element F2 comprises a moving pin 31, of diameter D, which can be guided by a guide 32 fixed to the part 5 so as to be able to enter said housing 30, at most over a length L.

In addition, the element G2 comprises a means 33, for example an electric motor, capable of shifting said moving pin 31, as illustrated by an arrow 33A.

In a first alternative form, said locking system 20 comprises two locking means M2, the respective moving pins 31 of which are arranged in two different directions, preferably perpendicular directions, to avoid any linear displacement in the plane thus defined. In addition, one of these means M2 has a so-called "long" centering feature, that is to say one which satisfies the following relationship between said length L and said diameter D: L/D>2.

In a second alternative form, said locking system 20 comprises three locking means M2 each having a so-called "short" centering feature (L/D<2). In addition, the moving pins 31 of at least two of these means M2 are arranged in two different directions, preferably perpendicular directions.

Figure 5:
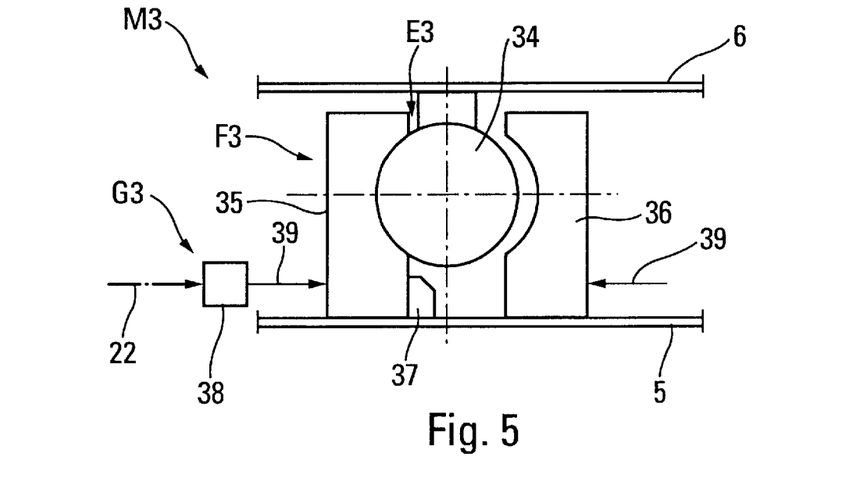

In a third embodiment M3 of the locking means, depicted diagrammatically in FIG. 5:
  the element E3 comprises a sphere 34;
  the element F3 comprises at least two moving parts 35 and 36 shaped, preferably in the shape of half shells, so as to be able to trap said sphere 34, and a stop piece 37 fixed to the part 5 to impose a given position on the moving part 35, the moving part 36 pressing and holding the sphere 34 between said moving part 35; and
  the element G3 comprises a means 38, for example an electric motor, capable of shifting said moving parts and 36 as illustrated by arrows 39.

This third embodiment is particularly effective and, in particular, presents no risk of the moving element (parts 35 and 36) and fixed element (sphere 34) jamming.

Figure 6:
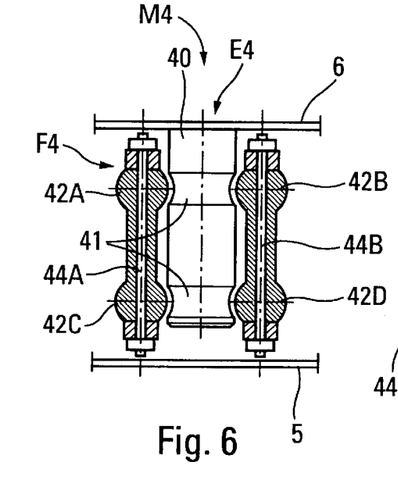
Figure 7:
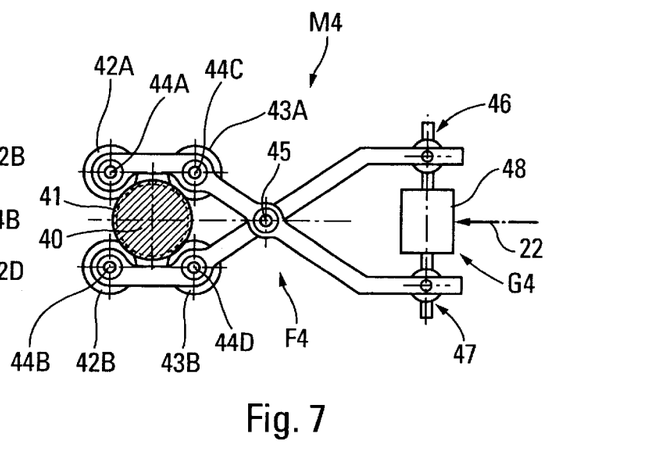
Figure 8:
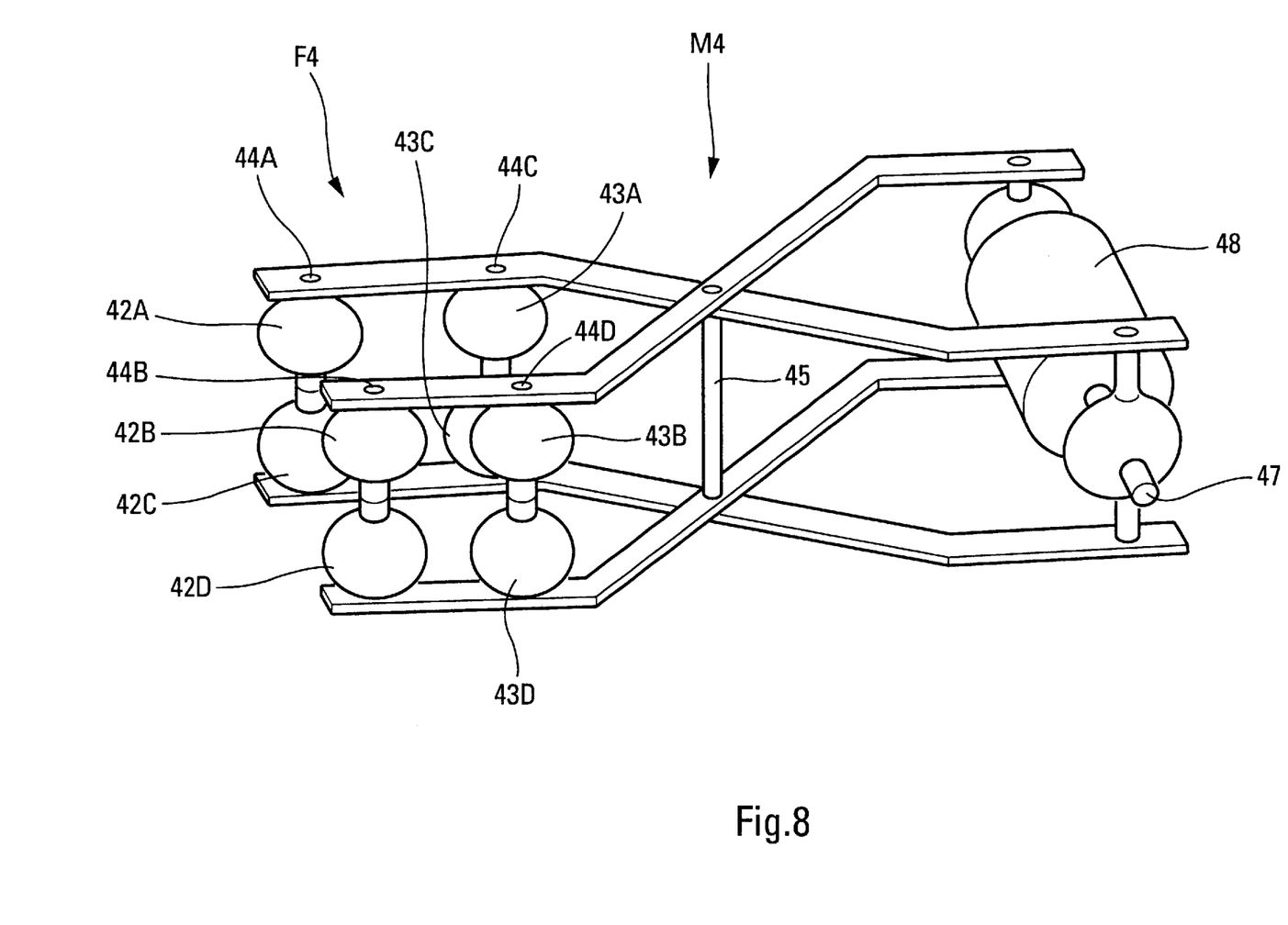

Furthermore, in a fourth embodiment M4 of the locking means, depicted diagrammatically in FIGS. 6, 7 and 8:
  the element E4 comprises a pin 40 which, according to the alternative form in question, has one or two annular grooves 41, preferably with a circular recess;
  the element F4 comprises an actuatable clamping system which comprises, at the clamping end, at least four spheres 42A, 42B, 42C, 42D, 43A, 43B, 43C, 43D, preferably with the same radius as the circular recess of the annular groove 41 and capable of trapping said pin 40 by acting in said annular groove 41 in a uniformly distributed way around the periphery of said pin 41; and the element G4 comprises a means 48 capable of actuating said clamping system F4.

As a preference, said means 48 is a rotational drive device, of the conventional type, driving the rotation of two pins 46 and 47 which, respectively, have a right-hand thread and a left-hand thread and which are mounted in appropriately tapped holes of said clamping system F4. Thus, the rotation brought about by the means 48 in one direction allows the clamps which are articulated about a pin 45 to be tightened, and the rotation in the opposite direction leads to the opening of said clamps, each of these clamps comprising at least two spheres, as depicted in FIGS. 7 and 8.

The pin 45 and the rotational drive device 48 are additionally fixed to the part 5.

It will be noted that the annular groove may have a recess of a shape other than circular, for example of conical shape, said sphere preferably having a contour tailored to the shape of said recess.

According to a first alternative form, the locking system 20 comprises two locking means M4, each of these means M4 comprising:

a pin 40 having two grooves 41; and a clamping system F4 comprising eight spheres capable of acting, in groups of four spheres, in said two grooves respectively. For this purpose, said spheres are connected in pairs by pins 44A, 44B, 44C, 44D such as the pin 44A which connects the spheres 42A and 42C or the pin 44B which connects the spheres 42B and 42D, as depicted in FIG. 6.

Furthermore, in a second alternative form, said locking system 20 comprises three locking means M4, each of these means M4 comprising:

a pin 40 which has just one groove; and a clamping system which comprises just four spheres intended to act in this single groove.

Figure 9:
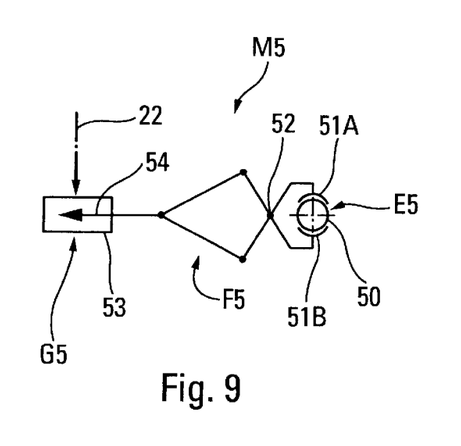

Furthermore, in a fifth embodiment M5 of the locking means, depicted very diagrammatically in FIG. 9:

the element E5 comprises one sphere 50 fixed to the part 6;

the element F5 comprises an actuatable clamping system comprising two arms, the respective ends 51A and 51B of which are shaped in such a way as to be able to trap said sphere. This clamping system is fixed via an articulation 52 to the part 5; and the element G5 comprises a means 53 fixed to the part 5, preferably a pulling means, capable of actuating the clamping system in the direction illustrated by an arrow 54, so that this system traps said sphere.

Figure 10:
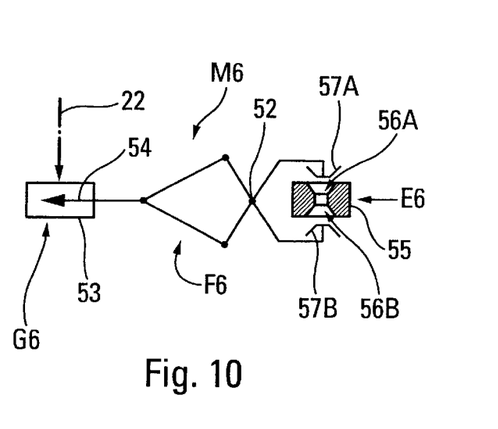

Finally, as can be seen in FIG. 10, a sixth embodiment M6 of the locking means comprises:

an element G6 identical to the element G5;

an element E6 which comprises a part 55 which has two housings 56A and 56B, preferably conical ones; and an element F6 which is the same type as the element F5, except for the ends 57A and 57B of the arms which are formed in such a way as to be able to act respectively in said housings 56A and 56B of the part 55.

As far as the aforementioned embodiments M1 to M6 are concerned, it will be noted that:

the various third elements G1 to G6 may of course act in both directions, both for achieving locking and for achieving unlocking, although for reasons of simplification of the drawing, the action of these elements in the locking direction (arrows 27, 33A, 39, 54) has been illustrated in each case;

it is conceivable for manual controls rather than merely automatic controls to be achieved; and the various shapes (conical, spherical, etc.) of at least some of the first E1 to E6 and second F1 to F6 elements are given by way of preferred but nonlimiting embodiments. Specifically, what is most important is that the respective shapes of said first and second elements be suited and complementary.

The suspension device 4 according to the invention and described previously is particularly suited to connecting a sighting means 2 of a sighting apparatus for the structure 3 of a helicopter 1, as depicted in FIG. 1, so as to form, with this sighting apparatus SV, a sighting system according to the invention, of line of sight V1.

In the known way, such a sighting apparatus, for example an infrared sight, comprises, in addition to said sighting means 2 capable of taking images of the external environment of said helicopter 1, a display means, not depicted, for example a screen, particularly a "head-up" screen capable of displaying the images taken by said sighting means 2 to an operator, particularly a pilot of the helicopter 1.

Thus, by virtue of the invention, said sighting system SV has two different sighting modes:

a stabilized sighting mode in which said suspension device 4 is brought into the unlocked position; and a fixed sighting mode in which said suspension device 4 is brought into the locked position.

This sighting system SV with a dual sighting mode may, in particular, be integrated into a weapon system SA additionally comprising:

a vehicle 1, particularly a helicopter, carrying said sighting system SV. This vehicle may just as easily be a tank or some other military vehicle;

a first weapon unit U1 mounted on said vehicle 1; and a second weapon unit U2, also mounted on said vehicle 1.

These weapon units U1 and U2 are such that, as far as sighting for firing is concerned, one U1 of these weapon units U1, U2, for example a missile firing system, requires a stabilized sighting mode, and the other weapon unit U2, for example a gunfire system, requires a fixed sighting mode, that is to say a sighting mode for which the firing line V2 of this weapon unit U2 and the line of sight V1 of the sighting system SV are stable one with respect to the other, and preferably parallel.

As said sighting system SV can employ these two different sighting modes (stabilized/fixed), the weapon system SA according to the invention allows two different firing rules to be fulfilled using one and the same sighting system SV.

What is claimed is:

1. A suspension device for connecting an item of on-board equipment to the structure of a vehicle, particularly a rotary-wing aircraft, said suspension device comprising:

(a) first and second parts shaped at least approximately in the form of plates and capable of being fixed respectively to said structure and to said item of equipment;

(b) suspension means which are arranged between said first and second parts and which are capable of absorbing, on the one hand, relative linear displacements of said first and second parts along three reference axes in roll, pitch and yaw of said vehicle and, on the other hand, the relative angular excursions of said first and second parts about said three reference axes;

(c) a controllable locking system capable of bringing said suspension device into one of the following two positions:

a locked position in which said locking system immobilizes said first and second parts one with respect to the other in a given relative position; and an unlocked position in which said locking system releases said first and second parts to move relative to one another; and (d) control means for controlling said locking system, wherein said control means is remote from said suspension means and said controllable locking system.

2. The device as claimed in claim 1, wherein said locking system comprises at least two locking means.

3. The device as claimed in claim 2, wherein at least one of said locking means comprises:

a first element fixed to one of said first and second parts, facing the other of said parts;

a second element at least partially connected to said other part and capable of collaborating with said first element to obtain a fixed connection between said first and second parts, via said first and second elements; and a controllable third element capable of bringing said first and second elements into collaboration to obtain said locked position, and capable of separating said first and second elements one from the other to obtain said unlocked position.

4. The device as claimed in claim 3, wherein said first element comprises a tenon, said second element comprises a centering piece which is fixed to said other part facing said tenon and which comprises a mortise of a shape tailored to said tenon, and said third element comprises a means capable of bringing said two parts closer together in order to bring said tenon into said mortise.

5. The device as claimed in claim 3, wherein said first element comprises a housing, said second element comprises a moving pin which can be guided by a guide fixed to said other part and which is capable of entering said housing which has a shape tailored to said pin, and said third element comprises a means of displacing said moving pin.

6. The device as claimed in claim 5, wherein said locking system comprises two locking means, for one of which the length of the part of the housing capable of accommodating said pin is greater than or equal to twice the diameter of said pin which has a circular cross section.

7. The device as claimed in claim 5, wherein said locking system comprises three similar locking means, for each of which the length of the part of the housing capable of accommodating said pin is less than twice the diameter of said pin which has a circular cross section.

8. The device as claimed in claim 3, wherein said first element comprises a sphere, said second element comprises at least two moving parts shaped so as to be able to trap said sphere, and said third element comprises a means capable of displacing said moving parts.

9. The device as claimed in claim 3, wherein said first element comprises a pin which has at least one annular groove on its outer face, said second element comprises an actuatable clamping system comprising at least four spheres capable of trapping said pin by acting in said groove, in a uniformly distributed way around the periphery of said pin, and said third element comprises a means capable of actuating said clamping system.

10. The device as claimed in claim 9, wherein said locking system comprises two similar locking means, for each of which the pin has two annular grooves and the clamping system has eight spheres capable of acting in groups of four spheres in said two grooves respectively.

11. The device as claimed in claim 9, wherein said locking system comprises three similar locking means, for each of which the pin has just one annular groove and the clamping system has four spheres.

12. The device as claimed in claim 3, wherein said first element comprises a sphere, said second element comprises an actuatable clamping system capable of trapping said sphere, and said third element comprises a means capable of actuating said clamping system.

13. The device as claimed in claim 3, wherein said first element comprises a part which has a double housing, said second element comprises an actuatable clamping system, the two free ends of said clamp being capable of acting respectively in said double housing, and said third element comprises a means capable of actuating said clamping system.

14. A sighting system for a vehicle, particularly a rotary-wing aircraft, said sighting system comprising:

a sighting apparatus comprising a sight means capable of taking images of the external environment of said vehicle and a display means capable of displaying the images taken by said sight means; and a suspension device allowing said sight means to be connected to the structure of said vehicle, wherein said suspension device is a device of the type specified in claim 1, and said sighting system has two different sighting modes:

a stabilized sighting mode, for which said suspension device is brought into the unlocked position; and a fixed sighting mode, for which said suspension device is brought into the locked position.

15. A weapon system comprising:

a vehicle, particularly a rotary-wing aircraft;

a first weapon unit mounted on said vehicle; and a sighting system also mounted on said vehicle and capable of taking images of the environment of said vehicle, at least during use of said first weapon unit, and which additionally comprises a second weapon unit, also mounted on said vehicle, and in which weapon system said sighting system is a system of the type specified in claim 14, and said sighting system is formed in such a way as to be brought:

into said stabilized sighting mode when one of said first and second weapon units is used; and into said fixed sighting mode when the other of said first and second weapon units is used.

16. A suspension device for connecting an item of on-board equipment to the structure of a vehicle, particularly a rotary-wing aircraft, said suspension device comprising:

(a) first and second parts shaped at least approximately in the form of plates and capable of being fixed respectively to said structure and to said item of equipment;

(b) a suspension means, which is arranged between said first and second parts, for absorbing, on the one hand, relative linear displacements of said first and second parts along three reference axes in roll, pitch and yaw of said vehicle and, on the other hand, the relative angular excursions of said first and second parts about said three reference axes;

(c) a controllable locking system comprising at least two locking means for bringing said suspension device into the following two positions:

a locked position in which said locking system immobilizes said first and second parts one with respect to the other in a given relative position, and an unlocked position in which said locking system releases said first and second parts to move relative to one another; and (d) a control means for controlling said controllable locking system, wherein:

at least one of said two locking means comprises:

a first element fixed to one of said first and second parts, facing the other of said parts, a second element at least partially connected to said other part and capable of collaborating with said first element to obtain a fixed connection between said first and second parts, via said first and second elements, and a controllable third element capable of bringing said first and second elements into collaboration to obtain said locked position, and capable of separating said first and second elements one from the other to obtain said unlocked position.

17. A suspension device for connecting an item of on-board equipment to the structure of a weapons-mounted vehicle, said suspension device comprising:

(a) first and second parts shaped at least approximately in the form of plates and capable of being fixed respectively to said structure and to said item of equipment;

(b) suspension means which are arranged between said first and second parts and which are capable of absorbing, on the one hand, relative linear displacements of said first and second parts along three reference axes in roll, pitch and yaw of said vehicle and, on the other hand, the relative angular excursions of said first and second parts about said three reference axes;

(c) a controllable locking system capable of bringing said suspension device into one of the following two positions:

a locked position in which said locking system immobilizes said first and second parts one with respect to the other in a given relative position; and an unlocked position in which said locking system releases said first and second parts to move relative to one another; and (d) control means for controlling said locking system, wherein said control means is remote from said suspension means and said controllable locking system.

* * * * *